United States Patent
Ko et al.

(10) Patent No.: US 12,386,385 B2
(45) Date of Patent: *Aug. 12, 2025

(54) FLEXIBLE VIBRATION FILM AND DISPLAY HAVING THE SAME

(71) Applicant: LG Display Co., Ltd., Seoul (KR)

(72) Inventors: Sungwook Ko, Paju-si (KR); YongWoo Lee, Paju-si (KR); Chiwan Kim, Paju-si (KR); Taeheon Kim, Paju-si (KR); Sung-Eui Shin, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 227 days.

This patent is subject to a terminal disclaimer.

(21) Appl. No.: 18/309,717

(22) Filed: Apr. 28, 2023

(65) Prior Publication Data

US 2023/0266790 A1    Aug. 24, 2023

Related U.S. Application Data

(63) Continuation of application No. 17/131,389, filed on Dec. 22, 2020, now Pat. No. 11,669,126.

(30) Foreign Application Priority Data

Dec. 31, 2019    (KR) .......................... 10-2019-0179559

(51) Int. Cl.
*G06F 1/16*    (2006.01)
*G06F 3/16*    (2006.01)
(Continued)

(52) U.S. Cl.
CPC .............. *G06F 1/1605* (2013.01); *G06F 3/16* (2013.01); *G09F 9/301* (2013.01); *G10K 9/122* (2013.01); *G06F 1/1652* (2013.01)

(58) Field of Classification Search
CPC .......... G06F 3/016; G06F 1/1605; G06F 3/16; G06F 1/1652; G09F 9/301; G10K 9/122;
(Continued)

(56) References Cited

U.S. PATENT DOCUMENTS

| 5,288,551 | A  | 2/1994 | Sato et al. |
| 9,440,259 | B2 | 9/2016 | Miyoshi |

(Continued)

FOREIGN PATENT DOCUMENTS

| CN | 1512822   | A | 7/2004 |
| CN | 203057505 | * | 7/2013 |

(Continued)

OTHER PUBLICATIONS

Chinese Office Action dated Aug. 16, 2022, issued in corresponding Chinese Patent Application No. 202011437784.6.

(Continued)

*Primary Examiner* — Norman Yu

(74) *Attorney, Agent, or Firm* — Morgan, Lewis & Bockius LLP

(57) ABSTRACT

The present disclosure relates to a flexible vibration film and a display apparatus having the same. A flexible vibration film includes: a vibration layer; a first electrode layer disposed on a bottom surface of the vibration layer; and a second electrode layer disposed on a top surface of the vibration layer, wherein the vibration layer includes: a first vibration unit having a first vibration characteristics; a second vibration unit having a second vibration characteristics; and a flexible insulating part disposed between the first vibration unit and the second vibration unit, and wherein the first electrode layer includes: a first part corresponding to the first vibration unit; and a second part corresponding to the second vibration unit.

15 Claims, 9 Drawing Sheets

(51) Int. Cl.
*G09F 9/30* (2006.01)
*G10K 9/122* (2006.01)

(58) Field of Classification Search
CPC .......................... H04R 2499/15; H04R 17/00; H04R 2499/11; H04R 2400/03; H04R 1/2807
USPC ........ 381/388, 152, 191, 173, 333; 345/173, 345/156; 455/566
See application file for complete search history.

(56) References Cited

U.S. PATENT DOCUMENTS

| | | | |
|---|---|---|---|
| 10,341,774 | B2 | 7/2019 | Inoue et al. |
| 10,592,034 | B2 | 3/2020 | Shim et al. |
| 11,190,865 | B2 | 11/2021 | Zhou et al. |
| 2004/0124748 | A1 | 7/2004 | Takeshima et al. |
| 2009/0021354 | A1 | 1/2009 | Furosho |
| 2014/0334078 | A1* | 11/2014 | Lee .................. H04M 1/03 361/679.01 |
| 2015/0185963 | A1 | 7/2015 | Lee et al. |
| 2018/0321784 | A1 | 11/2018 | Park et al. |
| 2019/0014402 | A1 | 1/2019 | Ahn et al. |
| 2019/0050024 | A1 | 2/2019 | Ahn et al. |
| 2020/0209387 | A1 | 7/2020 | Yeon et al. |

FOREIGN PATENT DOCUMENTS

| | | |
|---|---|---|
| CN | 203057505 U | 7/2013 |
| CN | 109244108 A | 1/2019 |
| CN | 109389917 A | 2/2019 |
| CN | 110351402 A | 10/2019 |
| CN | 110572756 A | 12/2019 |
| EP | 0528279 A1 | 8/1992 |
| JP | H06-216422 A | 8/1994 |
| JP | 2015-126605 A | 7/2015 |
| JP | 2018-125605 A | 8/2018 |
| JP | WO2017/069055 A1 | 8/2018 |
| KR | 10-1578806 B1 | 12/2015 |
| KR | 10-2017-0053109 A | 5/2017 |
| KR | 10-2018-0090589 A | 8/2018 |
| WO | 2014/157351 A1 | 10/2014 |

OTHER PUBLICATIONS

Chinese Office Action dated Mar. 28, 2022, issued in corresponding Chinese Patent Application No. 202011437784.6.

Office Action dated Dec. 21, 2023 for Chinese Patent Application No. 202011437784.6.

Yongbin, Liu, et al., "Experimental Study on Piezoelectric Radial Field Diaphragm", Dec. 2010, Piezoelectrics & Acousto Optics, vol. 32, Issue 6, p. 1018-1020 (See English Abstract).

Liu Dechun, "Structure Design and Dynamics Analysis of Piezoelectric Tactile Feedback Actuator", May 2018, Master's Dissertation, Yanshan University, 144 pages total (See English Abstract).

Chi-Ying Lin, et al., "Lateral Vibration Modal Control of a Smart Cantilever Beam by Electrode Configuration of Piezoelectric Actuator", 2017, IEEE International Conference on Mechatronics and Automation, p. 1210-1215.

\* cited by examiner

FLEXIBLE VIBRATION FILM AND DISPLAY HAVING THE SAME

CROSS-REFERENCE TO RELATED APPLICATIONS

This application is a continuation of application Ser. No. 17/131,389 filed on Dec. 22, 2020, which claims the priority benefit of the Korean Patent Application No. 10-2019-0179559 filed in the Republic of Korea on Dec. 31, 2019, the entirety of each of which is incorporated herein by reference for all purposes as if fully set forth herein.

BACKGROUND

Technical Field

The present disclosure relates to a flexible vibration film and a display apparatus having the same, and more particularly to an integrating type flexible vibration film for generating different sounds and vibrations distinguished in accordance with the sectors by using a flexible vibration module, and a display including the same flexible vibration film.

Discussion of the Related Art

The display is a device having a display panel for representing various video data and a speaker for providing the sound information. When installing the speakers with the display, a space for speaker should be ensured so that the design and space arrangement for the display may be restricted.

For example, the speaker may be an actuator including a magnet and coil. When applying the actuator into the display, there is a disadvantage that the thickness should be thick for ensuring a space for actuator. In order to ensure the display to be thin condition, a piezoelectric element implementing thin thickness is used.

The piezoelectric elements are brittle and are easily damaged from the external impacts, and there may be a problem in which the reliability of sound production is degraded.

SUMMARY

Accordingly, embodiments of the present disclosure are directed to a flexible vibration film and a display having the same that substantially obviates one or more of the problems due to limitations and disadvantages of the related art.

One aspect of the present disclosure for overcoming the problems of related arts is to suggest a vibration element implemented with excellent flexibility and ultra-thin type of speaker, receiver, microphone and haptic elements, and a display including this vibration element. Another aspect of the present disclosure is to suggest an integrated type flexible vibration film implemented in one film structure including a plurality of vibration elements for speaker, receiver, microphone and haptic elements, and to suggest a display panel including this intergrated type flexible vibration film. Still another aspect of the present disclosure is to suggest an integrated flexible vibration film including one flexible film element implemented with a plurality of vibration elements specified in accordance with the virbration characteristics of the speaker, receiver, microphone and haptic element, and to suggest a display panel including the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a flexible vibration film comprises: a vibration layer; a first electrode layer disposed on a bottom surface of the vibration layer; and a second electrode layer disposed on a top surface of the vibration layer, wherein the vibration layer includes: a first vibration unit having a first vibration characteristics; a second vibration unit having a second vibration characteristics; and a flexible insulating part disposed between the first vibration unit and the second vibration unit, and wherein the first electrode layer includes: a first part corresponding to the first vibration unit; and a second part corresponding to the second vibration unit.

In one embodiment, the flexible vibration film further comprises: a first protective layer covering the first electrode layer; and a second protective layer covering the second electrode layer.

In one embodiment, the first vibration unit includes: a plurality of first piezoelectric parts having a first width; and a plurality of first insulating parts between each of the plurality of the first piezoelectric parts. The second vibration unit includes: a plurality of second piezoelectric parts having a second width; and a plurality of second insulating parts between each of the plurality of the second piezoelectric parts.

In one embodiment, the first piezoelectric parts and the second piezoelectric parts include an inorganic material; and the first insulating part and the second insulating part include an organic material.

In one embodiment, the plurality of the first piezoelectric parts, the plurality of the insulating parts, the plurality of the second piezoelectric parts and the plurality of the second insulating parts are arranged side by side on a same plane; and the first piezoelectric parts have different size from the second piezoelectric parts.

In one embodiment, the vibration layer further includes a third vibration unit having a third vibration characteristics; and the flexible insulating part is disposed among the first vibration unit, the second vibration unit and the third vibration unit.

In one embodiment, the flexible vibration film further comprises: a first signal line connected to the first electrode part, disposed on the flexible insulating part and extended to an end side of the vibration layer; and a second signal line connected to the second electrode part, disposed on the flexible insulating part and extended to the end side of the vibration layer.

In one embodiment, the first vibration unit and the second vibration unit divided in a plurality of sectors; and the sectors of the first vibration unit and the sectors of the second vibration unit are alternately arrayed.

In one embodiment, the first vibration unit provides a sound wave of 300 Hz to 20,000 Hz; and the second vibration unit provides a vibration wave of 60 Hz to 280 Hz.

In one embodiment, the first vibration unit provides a sound wave of 300 Hz to 20,000 Hz; and the second vibration unit provides any one of the sound wave of 300 Hz to 20,000 Hz and a vibration wave of 60 Hz to 280 Hz.

In another aspect, a flexible vibration film comprises: a vibration layer including a first vibration unit, a second vibration unit and a flexible insulating part between the first vibration unit and the second vibration unit; an upper electrode layer including a first electrode on the first vibration unit and a second electrode on the second vibration unit; a lower electrode layer disposed on a bottom surface of the vibration layer; an upper protective layer covering the upper electrode layer; and a lower protective layer covering the lower electrode layer.

In one embodiment, the first vibration unit includes: a plurality of first piezoelectric parts having a first width; and a plurality of first insulating parts among the plurality of the first piezoelectric parts. The second vibration unit includes: a plurality of second piezoelectric parts having a second width; and a plurality of second insulating parts among the plurality of the second piezoelectric parts.

In one embodiment, the plurality of the first piezoelectric parts, the plurality of the first insulating parts, the plurality of the second piezoelectric parts and the plurality of the second insulating parts are arranged side by side on a same plane; and the first piezoelectric parts have different size from the second piezoelectric parts.

In one embodiment, the flexible vibration film further comprises: a first signal line connected to the first electrode, disposed on the flexible insulating layer and extended to an end side of the vibration layer; and a second signal line connected to the second electrode, disposed on the flexible insulating layer and extended to the end side of the vibration layer.

In one embodiment, the first vibration unit and the second vibration unit are divided into a plurality of secotors; and the plurality of secotors of the first vibration unit and the second vibration unit are alternately arranged.

In one embodiment, the first vibration unit provides a sound wave of 300 Hz to 20,000 Hz; and the second vibration unit provides any one of the sound wave of 300 Hz to 20,000 Hz and a vibration wave of 60 Hz to 280 Hz.

In another aspect, a display comprises: a flexible vibration film; a substrate on an surface of the flexible vibration film; an emission layer on the substrate; an encapsulation layer on the emission layer; a cover plate on the encapsulation layer; and a middle frame on an opposite surface of the flexible vibration film. The flexible vibration film comprises: a vibration layer; a first electrode layer disposed on a bottom surface of the vibration layer; and a second electrode layer disposed on a top surface of the vibration layer, wherein the vibration layer includes: a first vibration unit having a first vibration characteristics; a second vibration unit having a second vibration characteristics; and a flexible insulating part disposed between the first vibration unit and the second vibration unit, and wherein the first electrode layer includes: a first part corresponding to the first vibration unit; and a second part corresponding to the second vibration unit.

According to the present disclosure, it may provide a flexible vibration film which may have an excellent sound pressure characteristics and sound positioning characteristics, an excellent flexibility and a superior resistance to the external impacts. Applying the flexible vibration film according to the present disclosure, it may provide a display with enhanced reliability and improved customer satisfaction.

According to the present disclosure, by implementing a plurality of thin film type vibration elements having vibration characteristics specialized for speakers, receivers, microphons and haptic elements in the form of one flexible film, one integrated flexible vibration film may be manufactured. Using the integrated flexible vibration film according to the present disclosure, an ultra-thin, ultra-lightweight display may be provided as having various vibration functions. Further, a flexible display embedding or including a speaker, a microphone and/or haptic element.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION

Figure 1:
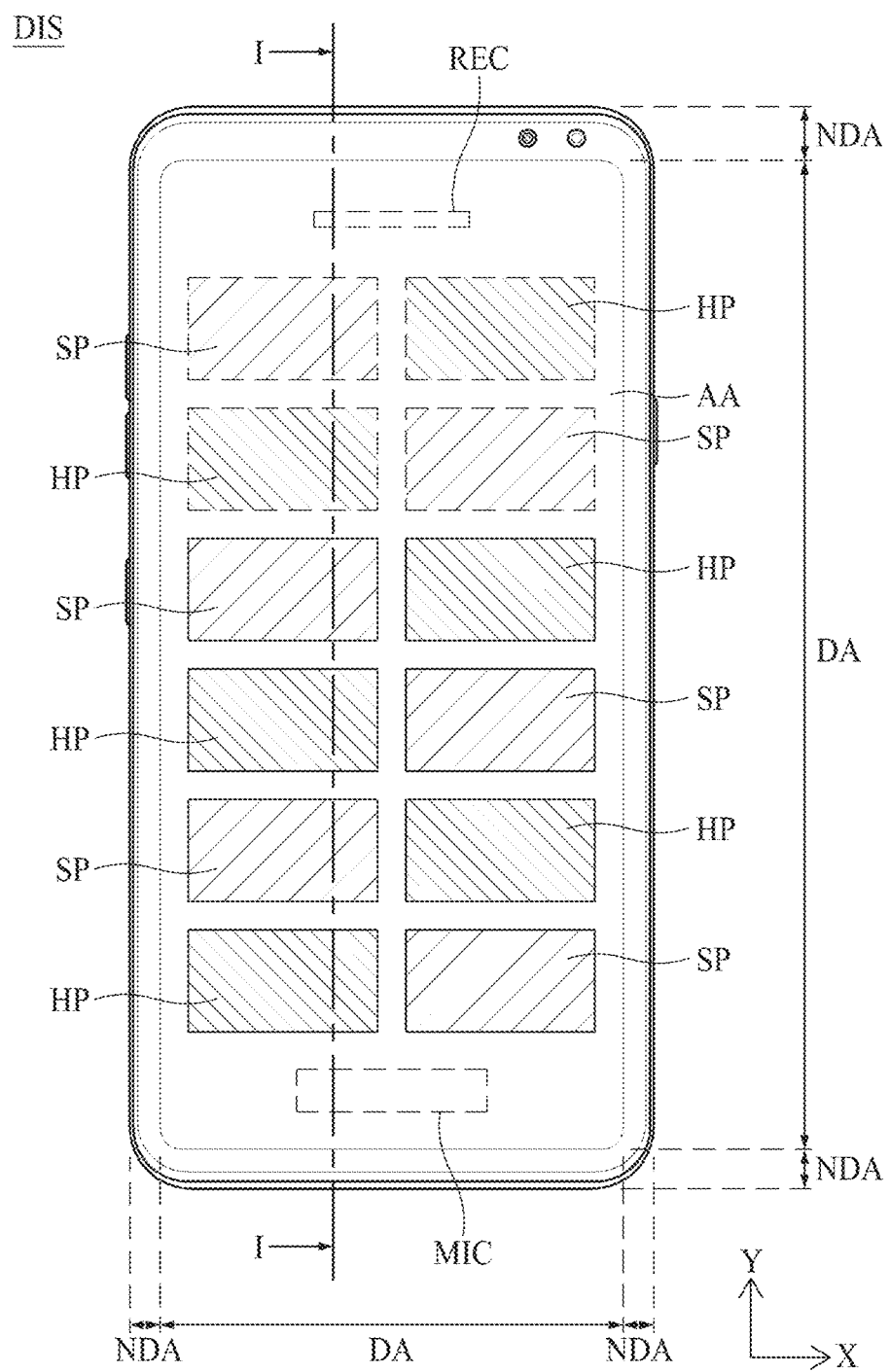
FIG. 1 is a plan view illustrating a display including an integrated type flexible vibration film according to the first embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In the case that "comprise," "have," and "include" described in the present specification are used, another part may also be present unless "only" is used. The terms in a singular form may include plural forms unless noted to the contrary.

In construing an element, the element is construed as including an error range although there is no explicit description.

In describing a positional relationship, for example, when the positional order is described as "on," "above," "below," and "next," the case of no contact there-between may be included, unless "just" or "direct" is used. If it is mentioned that a first element is positioned "on" a second element, it does not mean that the first element is essentially positioned above the second element in the figure. The upper part and the lower part of an object concerned may be changed depending on the orientation of the object. Consequently, the case in which a first element is positioned "on" a second element includes the case in which the first element is positioned "below" the second element as well as the case in which the first element is positioned "above" the second element in the figure or in an actual configuration.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as the first, the second, A, B, (a) and (b) may be used. These terms are only to distinguish the elements from other elements, and the terns are not limited in nature, order, sequence or number of the elements. When an element is described as being "linked", "coupled" or "connected" to another element that element may be directly connected to or connected to that other element, but indirectly unless otherwise specified. It is to be understood that other elements may be "interposed" between each element that may be connected to or coupled to.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in a co-dependent relationship.

The 'display apparatus' in this application may comprise a liquid crystal module (LCM), an organic light emitting display module (OLED Module), or a quantum dot module (QD Module) which are have a display panel and a driver for driving the display panel. The 'display apparatus' may further comprise a complete product or final product including LCM, OLED Module or QD Module such as a notebook computer, a television set, a computer monitor, an equipment apparatus having an automotive apparatus or other modules for vehicle, a set electronic apparatus or a set device (or set apparatus) such as a smart phone or a mobile electronic apparatus.

Therefore, the 'display apparatus' may be any one of a display device such as LCM, OLED Module and QD Module, an application device including LCM, OLED Module or QD Module, or a set apparatus for end user's final devices.

In another example, the LCM, OLED Module or QD Module may be referred to the 'display apparatus', and the final electronic devices including LCM, OLED Module or QD Module may be referred to the 'set apparatus'. For example, the display apparatus may include a display panel of liquid crystal display or organic electroluminescence display, and a source printed circuit board (PCB) for driving the display panel. The set apparatus may include the display apparatus and a set PCB or control PCB for driving the set apparatus itself by connecting to the display apparatus and the source PCB.

The display panel according to the embodiments of the present disclosure may include a liquid crystal display panel, an organic light emitting diode display panel, and an electroluminescent display panel, but it is not limited thereto. For example, display panel may have any structure in which the display panel may be vibrated to generate sound. In addition, the display panel applied to the display apparatus according to the embodiment of the present disclosure is not limited to the shape or size of the display panel.

In the case that the display panel is the liquid crystal display panel, the display panel may include a plurality of gate lines, a plurality of data lines, and a plurality of pixels (or sub pixels) defined by the gate lines and the data lines. The display panel may include an array substrate including thin film transistor as a switching element for controlling the light transmittance of each pixel, an upper substrate including a color filter and/or a black matrix, and a liquid crystal layer disposed between the array substrate and the upper substrate.

In the case that the display panel is an organic light emitting diode display panel, the display panel may include a plurality of gate lines, a plurality of data lines, and a plurality of pixels (or sub pixels) defined by the gate lines and the data lines. The display panel may include an array substrate including thin film transistor for applying the electric voltage to each pixel selectively, an organic light emitting layer on the array substrate, and an encapsulation substrate disposed on the array substrate for covering the organic light emitting layer. The encapsulation substrate may protect the thin film transistor and the organic light emitting layer from any external shocks, and prevent moisture and oxygen from penetrating into the organic light emitting layer. In addition, the organic light emitting layer formed on the array substrate may be replaced by the inorganic light emitting layer, the quantum dot light emitting layer, or the micro light emitting diode element.

Hereinafter, an example of a display apparatus according to the present disclosure will be described in detail with reference to the accompanying drawings. In designating reference numerals to elements of each drawing, the same components may have the same reference numerals as much as possible even though they are shown in different drawings. Scale of the elements shown in the accompanying drawings have a different scale from the actual for convenience of description, it is not limited to the scale shown in the drawings.

First Embodiment

Figure 2:
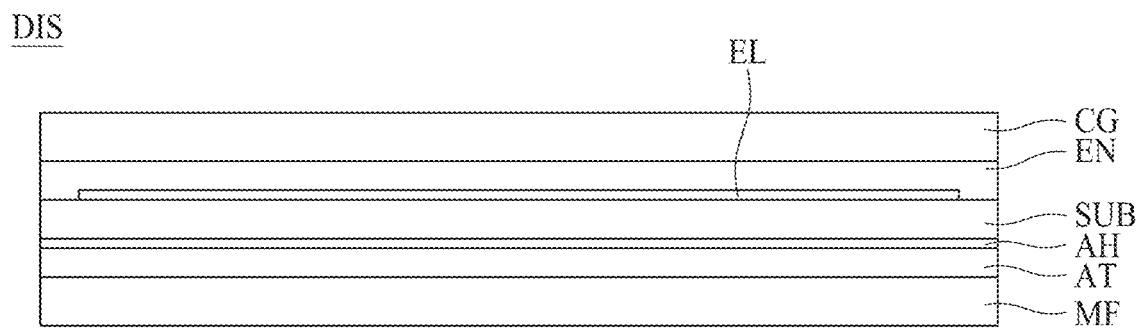
FIG. 2 is a cross-sectional view illustrating a sturucture of a display including an integrated type flexible vibration film according to the first embodiment of the present disclosure.

Hereinafter, referring to FIGS. 1 and 2, a display including an integrated type flexible vibration film according to the first embodiment may be described. FIG. 1 is a plan view illustrating a display including an integrated type flexible vibration film according to the first embodiment of the present disclosure. FIG. 2 is a cross-sectional view illustrating a sturucture of a display including an integrated type flexible vibration film according to the first embodiment of the present disclosure.

Referring to FIG. 1, a display DIS according to a first embodiment of the present disclosure may comprise a display area DA and a non-display area NDA. The display area DA is a first area for representing the video information, and may be defined as occupying the most of middle portions of the display DIS. The non-display area NDA is a second area for disposing a plurality of elements for providing data and/or signal to the display area DA, as surrounding the display area DA.

In the non-display area NDA, a camera CM and/or an infrared (ray) sensor SE. Even though not shown in figures, a logo or a brand tag may be disposed in the non-display area NDA.

The display area DA may include a receiver unit REC outputting a call sound, a microphone unit MIC inputting a call sound, a speaker unit SP outputting sounds of applications, and/or a haptic unit HP providing tactile information. Especially, the receiver unit REC, the microphone unit MIC, the speaker unit SP and the haptic unit HP may be integrated on one film.

For the case of a personal mobile information device such as a mobile phone, the receiver unit REC may be disposed as corresponding to ear of the user. For example, the receiver unit REC may be disposed upper middle portion of the display DIS. As the receiver unit REC is preferably to provide call sound only to individual user, it may have a very small size with a length of about 10 mm and a width of about 2 mm, suitable for protecting personal information.

For the case of a personal mobile information device such as a mobile phone, the microphone unit MIC may be disposed as corresponding to mouth of the user. For example, the microphone unit REC may be disposed lower middle portion of the display DIS. As the microphone unit REC is preferably to collect vibrations generated from the user's voice, it may have a size suitable for collecting sounds of various frequencies covering the audible sound frequencies.

Most of the middle area of the display DIS may be the portions that displays the video image or performs a touch input operation. The speaker unit SP and the haptic unit HP may be disposed in the middle area of the display DIS, as being divided into a plurality of sectors. For example, FIG. 1 shows a structure in which rectangular unit cells for speaker unit SP and the haptic unit HP are arranged in a 2×6 matrix manner. Here, a plurality of sectors for the speaker unit SP and the haptic unit HP are alternately arranged. However, it is not limited thereto, the embodiment may be implemented various manners.

The speaker unit SP may be a vibration element generating a sound wave of 200 Hz to 20,000 Hz. The speaker unit SP may directly vibrate the display DIS to output sounds in an audible range to the outside of the display DIS. It is preferable that each sector of the speaker unit SP has a suitable size to generate and provide the sound waves in various frequenc ranges.

The haptic unit HP may be a vibration element generating a physical vibration of 10 Hz to 300 Hz. The haptic unit HP may generate the vibrations in the display DIS itself. When a user touches the display DIS, the haptic unit HP may provide a tactile feedback to the finger. Further, it may provide the vibrations instead of a phone ring tone or the vibrations instead of a notification or an alarm.

There may be a frequency range overlapping between the vibration generated by the speaker unit SP and the vibration generated by the haptic unit HP. Considering that the frequency band most sensitive to haptical vibration is around 250 Hz, it is preferable to form the haptic unit HP to generate vibration in the range of 60 Hz to 280 Hz. Here, the vibration in the range of 60 Hz to 280 Hz generated by the haptic unit HP is actually overlapped with the low-pitched tone range generated in the speaker unit SP. Therefore, in order to exclude such overlapping, it is preferable that the speaker unit SP may be set to generate the sound vibration in the range of 320 Hz to 20,000 Hz and the haptic unit HP may be set to generate the haptic vibration in the range of 60 Hz to 280 Hz.

Referring to FIG. 2, the cross-sectional structure of the display according to the present disclosure will be explained. The display DIS according to the present disclosure may comprise a substrate SUB, an emission layer EL, an encapsulation layer EN, a cover plate CG, an integrated flexible vibration film AT, and a middle frame MF.

The substrate SUB may be made of a transparent glass or a transparent plastic material. In the case of a top emission type in which the emission light is provided onto the upper direction of the substrate SUB, the substrate SUB may be made of an opaque metal material. In the case of the flexible display, the substrate SUB may be made of a thin film material having an excellent flexibility.

The emission layer EL may be formed on a top surface of the substrate SUB. The emission layer EL may include a driving element layer such as a thin film transistor layer and an emitting element layer such as an organic light emitting diode layer which are sequentially stacked. In this disclosure, more detailed explanation for the emission layer EL will not be explained.

The encapsulation layer EN may be formed as covering the emission layer EL on the substrate SUB. The encapsulation layer EN is for protecting the emission layer EL and may have various structures. For an example, the encapsulation layer EN may have a triple layered structure in which a first inorganic layer, an organic layer and a second inorganic layer are sequentially stacked. For another example, the encapsulation layer EN may be implemented as attaching a glass substrate on the substate SUB using an optical adhesive.

The cover plate CG may be a protective plate attached on the encapsulation layer EN. The cover plate CG may be a transparent and rigid plate such as a glass plate. The cover plate CG may be a transparent protective film or plate for protecting the encapsulation layer EN and the emission layer EL from being damaged by any external impact or force.

The integrated type flexible vibration film AT may be disposed on the bottom surface of the substrate SUB. The bottom surface is opposited to and parallel with the top surface. For example, the integrated type flexible vibration film AT may be attached on the bottom surface of the substrate SUB using an adhesive layer. The integrated type flexible vibration film AT may be an element for directly providing the vibrations to the substrate SUB, and the detailed structure of it will be explained below.

The middle frame MF may be disposed on a bottom surface of the integrated type flexible vibration film AT. The middle frame MF may be an inserted element for supporting the substrate SUB and the integrated type flexible vibration film AT. The middle frame MF may be an element for linking to an enclosure (not shown in figures) of the display DIS. In some cases, the middle frame MF may be configured to be integrated with the enclosure.

Figure 3:
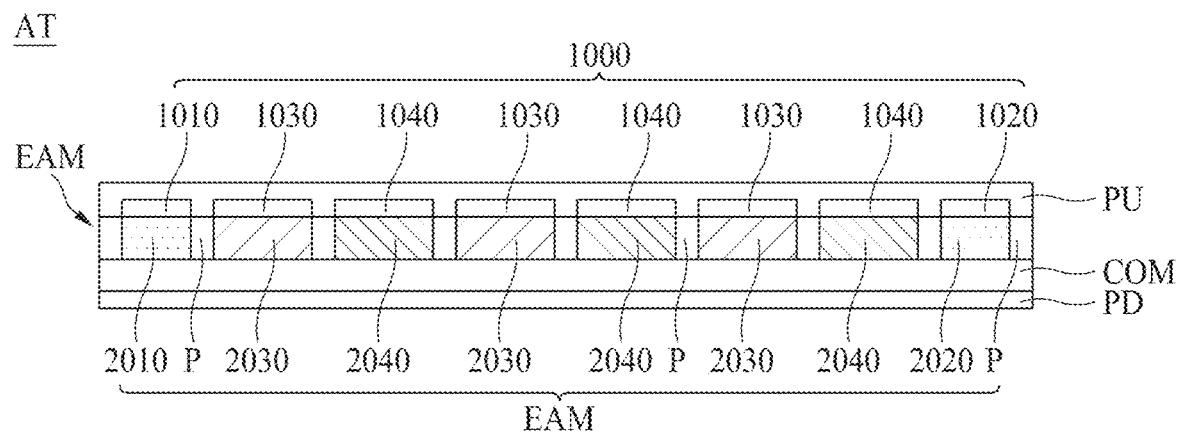
FIG. 3 is a cross-sectional view, along the cutting line I-I' in FIG. 1, illustrating a sturucture of an integrated type flexible vibration film according to the first embodiment of the present disclosure.

Hereinafter, referring to FIG. 3, the detailed structure of the integrated type flexible vibration film according to the first embodiment of the present disclosure will be described. FIG. 3 is a cross-sectional view, along the cutting line I-I' in FIG. 1, illustrating a sturucture of an integrated type flexible vibration film according to the first embodiment of the present disclosure.

Referring to FIG. 3, the integrated type flexible vibration film AT according to the first embodiment of the present disclosure may comprise a vibration layer EAM, a lower electrode COM, an upper electrode 1000, a lower protecting layer and an upper protecting layer PU. The vibration layer EAM may include a plurality of vibration units 2010, 2020, 2030 and 2040. The vibration layer EAM may further include a flexible insulating portion P disposed between each of the vibration units 2010, 2020, 2030 and 2040.

The vibration layer EAM may include a receiver unit 2010, a microphone unit 2020, a plurality of speaker units 2030 and a plurality of haptic units 2040. The vibration layer EAM may further include a flexible insulating portion P disposed as surrounding each of the receiver unit 2010, the microphone unit 2020, the speaker unit 2030 and the haptic unit 2040. The receiver unit 2010, the microphone unit 2020, the speaker units 2030, the haptic units 2040 and the flexible insulating portion P may be connected horizontally and arranged side by side on the same plane.

The lower electrode COM may be deposited as covering the whole surface of the vibration layer EAM. The lower electrode COM may include a conductive material such as a metal material or a transparent conductive material. When the transparent property is not required, the lower electrode COM may be made of a metal material. When the transparent property is required, the lower electrode COM may include a metal oxide material such as the indium tin oxide (ITO) or the indium zinc oxide (IZO).

The upper electrode 1000 may be formed on the top surface of the vibration layer EAM. Especially, the upper electrode 1000 may be divided into a plurality of sectors corresponding to each size of the plurality of vibration units 2010, 2020, 2030 and 2040 disposed at the vibration layer EAM. For example, a receiver electrode 1010 is formed on the receiver unit 2010, a microphone electrode 1020 is formed on the microphone unit 2020, each of speaker electrodes 1030 is formed on each of the speaker units 1020, each of haptic electrodes 1040 is formed on each of the haptic units 2040. The upper electrode 1000 may be made of the same material with the lower electrode COM.

The lower protective layer PD may be deposited on the bottom surface of the lower electrode COM. The lower protective layer PD may be to protect the lower electrode COM. The lower protective layer PD may be made of an organic insulating material. The upper protective layer PU may be desposited on the upper surface of the upper electrode 1000. The upper protective layer PU may be to protect the upper electrode 1000. The upper protective layer PU may be made of the organic insulating material same with the lower protective layer PD.

Figure 4:
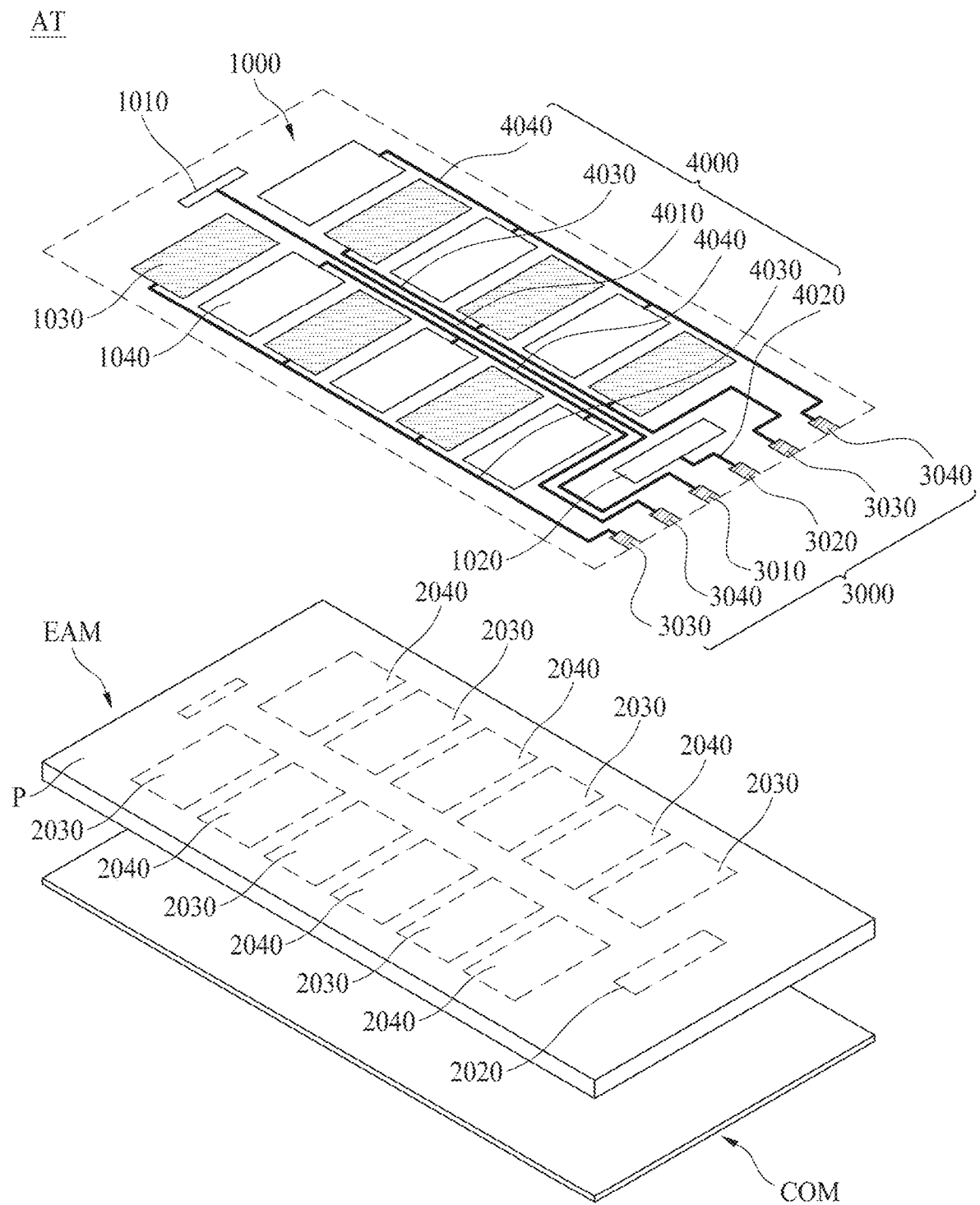
FIG. 4 is a perspective view illustrating a structure of a sturucture of an integrated type flexible vibration film according to the first embodiment of the present disclosure.

Hereinafter, referring to FIG. 4, a structure of an integrated type flexible vibration film according to the first embodiment of the present disclosure will be explained in detail. FIG. 4 is a perspective view illustrating a structure of a a sturucture of an integrated type flexible vibration film according to the first embodiment of the present disclosure. In FIG. 4, the stacked structure of the lower electrode COM, the vibration layer EAM and the upper electrode 1000 is illustrated as an exploded perspective view.

The lower electrode COM is disposed under the vibration layer EAM. The lower electrode COM may be deposited on the bottom surface of the vibration layer EAM, as having the same area and shape with the vibration layer EAM.

The vibration layer EAM may include a receiver unit 2010, a microphone unit 2020, a plurality of speaker units 2030, a plurality of haptic units 2040, and a flexible insulating portion P disposed as surrounding each of the vibration units 2010, 2020, 2030 and 2040. The receiver unit 2010, the microphone unit 2020, the speaker units 2030, the haptic units 2040 and the flexible insulating portion P may be connected horizontally and arranged side by side on the same plane. Especially, the insulating portion P may define the whole size of the vibration layer EAM, and the units 2010, 2020, 2030 and 2040 are arrayed within the flexible insulating portion P in a matrix manner.

The upper electrode 1000 may be divided into a plurality of sectors corresponding to each size of the plurality of vibration units 2010, 2020, 2030 and 2040 disposed at the vibration layer EAM. For example, the upper electrode 1000 may include a receiver electrode 1010 formed on the receiver unit 2010, a microphone electrode 1020 foremd on the microphone unit 2020, each of speaker electrodes 1030 formed on the each of the speaker units 2030, and each of the haptic electrodes 1040 formed on the each of the haptic units 2040.

Each of the upper electrodes 1010, 1020, 1030 and 1040 is connected to each of the link lines 4000. The link lines 4000 may be disposed on the flexible insulating layer P as being extended to the non-display area NDA. For example, the link lines 400 may include a receiver link line 4010 connected to the receiver electrode 1010, a microphone link line 4020 connected to the microphone electrode 1020, a plurality of speaker link lines 4030 connected to the plurality of speaker electrodes 1030, and a plurality of haptic link lines 4040 connected to the plurality of haptic link electrodes 1040.

A pad portion 3000 may be disposed on the flexible insulating portion P located at the non-display area NDA at outskirts of the microphone unit 2020. The link lines 4000 may be connected to each of pads 3010, 3020, 3030, 3040 disposed at the pad portion 3000. For example, the pad portion 3000 may include a receiver pad 3010 connected to the receiver link line 4010, a microphone pad 3020 connected to the microphone link line 4020, a plurality of speaker pads 3030 connected to the plurality of speaker link lines 4030, and a plurality of haptic pads 3040 connected to the plurality of haptic link lines 4040. FIG. 4 shows a structure having two columns in which the speaker electrodes 1030 and the haptic electrodes 1040 are arranged in two columns divided into left column and right column. In this case, the speaker pads 3030 and the haptic pads 3040 may be arranged as being grouped into left and right portions, respectively.

In FIG. 4, for convenience of description, the lower protective layer PD and the upper protective layer PU are not illustrated.

The vibration units 2010, 2020, 2030 and 2040 may be implemented in the form of a film. The vibration units 2010, 2020, 2030 and 2040 may be expressed as a sound generating module using the substrate SUB of the display DIS as a vibration plate, a sound generating device, a film actuator, a film-type piezoelectric composite actuator, a film speaker, and a film-type piezoelectric device, but embodiments are not limited thereto.

In order to secure piezoelectrid properties, the vibration units 2010, 2020, 2030 and 2040 may be configured with the piezoelectric ceramics, and a material such as a polymer may be further configured in the piezoelectric ceramics in order to supplement the impact resistance and to secure the flexibility of the piezoelectric ceramics.

Figure 5:
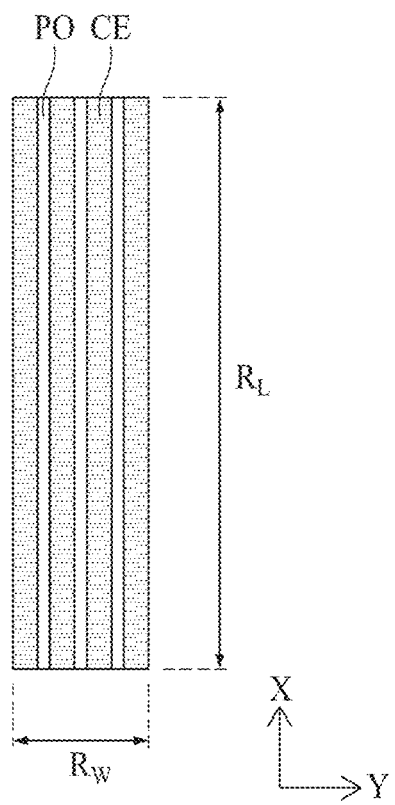
FIG. 5 is a plan view illustrating a structure of a first vibration unit according to the first embodiment of the present disclosure.

Hereinafter, referring to FIGS. 5 to 7, each of the virabtion units according to the first embodiment of the present disclosure will be described in detail. FIG. 5 is a plan view illustrating a structure of a first vibration unit according to the first embodiment of the present disclosure. Here, the first vibration unit may be the receiver unit 2010.

The receiver unit 2010 may have a rectangular shape including a predetermined width $R_W$ and a predetermined length $R_L$. However, embodiments are not limited thereto. In another example, the receiver unit 2010 may have an elongated ellipse shape.

The receiver unit 2020 may include a plurality of ceramic parts CE having the piezoelectric properties and a plurality of organic film parts PO having flexibility. Each of ceramic part CE and each of the organic film part PO may be alternately arranged. The ceramic parts CE may include an electro active material.

Each of the organic film parts PO may be disposed between each of the ceramic parts CE. Each of the plurality of ceramic parts CE and the plurality of the organic film parts PO may be disposed (or arranged) parallel to each other on the same plane (or the same layer). Each of the organic film parts PO may be configured to fill a gap between two adjacent ceramic parts CE, thereby being connected to or adhered to the adjacent ceramic part CE. Accordingly, the vibration energy of the receiver unit 2010 due to the linkage in the unit grid of the ceramic part CE may be increased by the organic film part PO. Therefore, the piezoelectric properties and flexibility may be enhanced at the same time.

The receiver unit 2010 may include a composite film (or organic-inorganic composite film) having a singl-layer structure by alternately arranging the ceramic parts CE and the organic film parts PO along the width direction (Y-axis) on the same plane. The organic material is disposed between the inorganic materials to absorb the impact applied to the inorganic material (or ceramic part CE) and to release the stress concentrated on the inorganic material. Accordingly, the receiver unit 2010 may have the enhanced durability.

Figure 6:
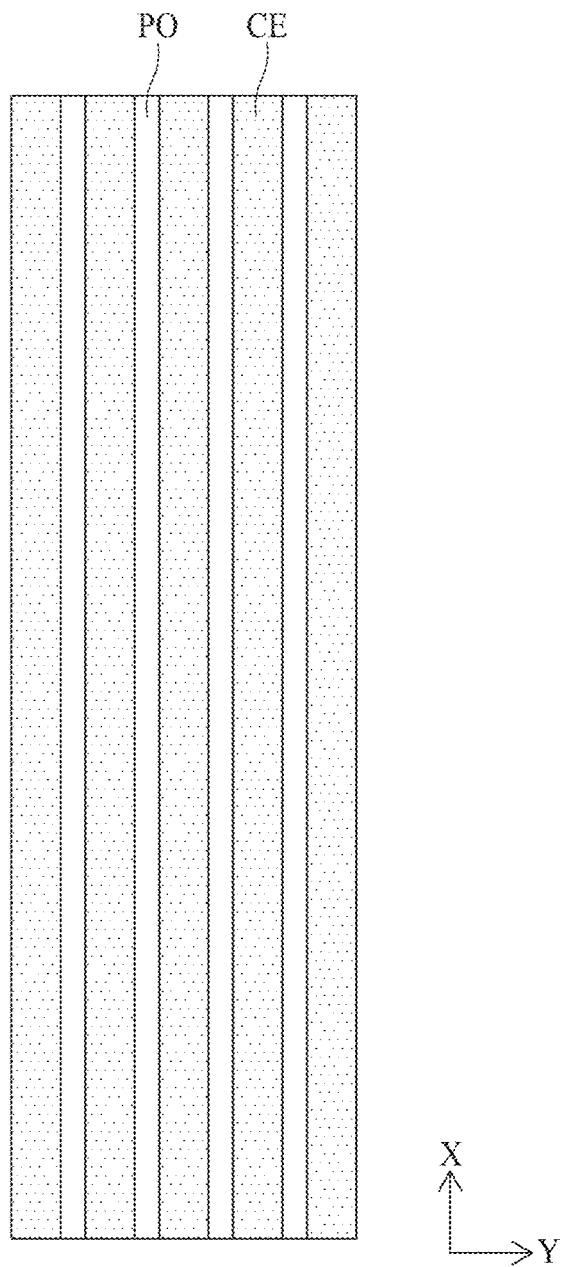
FIG. 6 is a plan view illustrating a structure of a second vibration unit according to the first embodiment of the present disclosure.

FIG. 6 is a plan view illustrating a structure of a second vibration unit according to the first embodiment of the present disclosure. Here, the second vibration unit may be the microphone unit 2020. The microphone unit 2020 may not receive an electric signal from the microphone pad 3020, but converts the vibration generated from the microphone unit 2020 into an electric signal and supplies it to the microphone pad 3020. In other words, the microphone unit 2020 may have the same structure as the receiver unit 2010, but the operation may be opposite.

For example, the receiver unit 2010 may generate the vibration according to the variation of the electric potential between the receiver upper electrode 1010 receiving the electric signal from a controller and the common electrode COM. The microphone unit 2020 may be vibrated by the external vibration forces, and the electric potential variations are occurred between the microphone upper electrode 1020 and the common electrode COM in accordance with the vibration forces. These electric potential variations may be converted into the electic signals in the controller.

The microphone unit 2020 may have a similar structure with the receiver unit 2010. The receiver unit 2010 may have smaller size than the microphone unit 2020, so that sounds may not spread to the outside and may be transmitted only to a user. However, the microphone unit 2020 may have a relatively large size so as to receive not only the user's voice but also sounds whitin a certain range, or may have a different feature.

In one example, the microphone unit 2020 may include, like the receiver unit 2010, a plurality of ceramic parts CE having the piezoelectric properties and a plurality of organic film parts PO having the flexibility properties. Each of the plurality of ceramic parts CE and each of the plurality of organic film parts PO may be alternately arranged. The ceramic parts CE may include an electro active material. The ceramic parts CE of the microphone unit 2020 may have wider width and longer length than the ceramic parts CE of the receiver unit 2010. The microphone unit 2020 may have more numers of the ceramic parts CE and the organic film parts PO alternately arranged than the receiver unit 2010.

As described above, in order to ensure more privary protection property, the receiver unit is preferable to have a relative small size because it is for transmitting sound only to the user with small vibration amplitude. It is preferable that the microphone unit actively receives a relatively wide range of sound bandwidths, so that the microphone unit may have relatively wide width and long length, or relatively more numbers of ceramic parts CE and the organic film parts PO.

Figure 7:
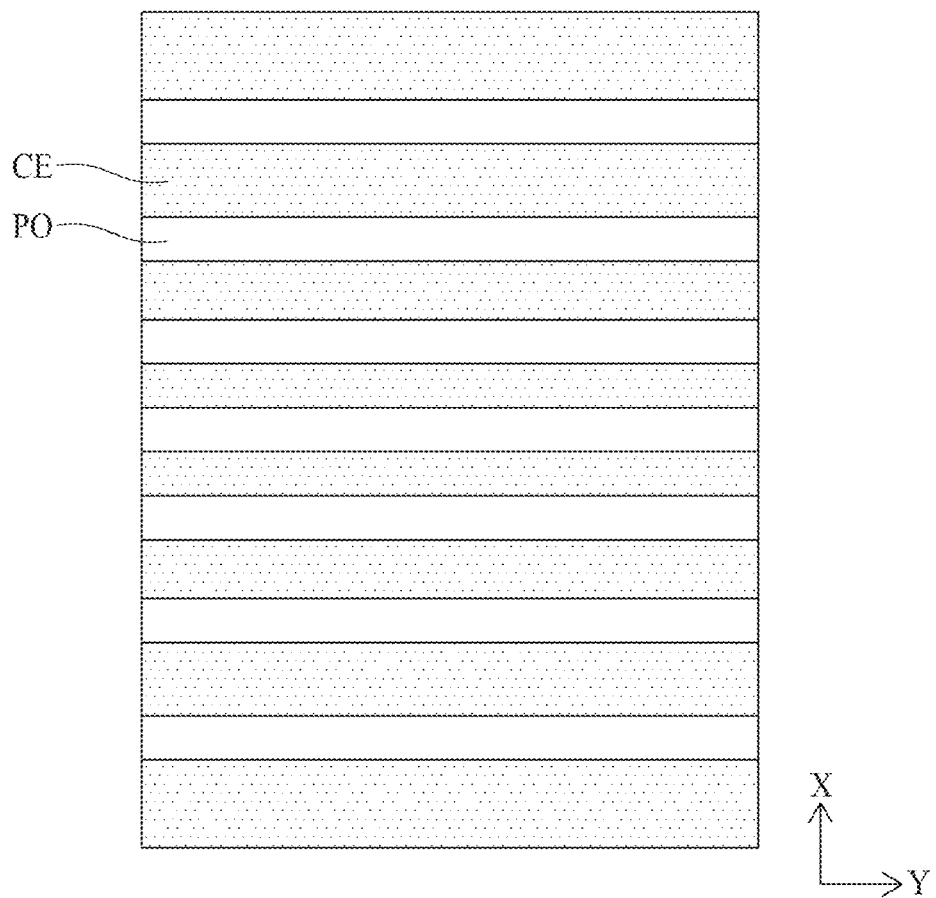
FIG. 7 is a plan view illustrating a structure of a third vibration unit according to the first embodiment of the present disclosure.

FIG. 7 is a plan view illustrating a structure of a third vibration unit according to the first embodiment of the present disclosure. Here, the third vibration unit may be the speaker unit 2030. For example, the speaker unit 2030 may have various shapes such as a square, a circle, and an oval shapes. In FIG. 7, the speaker unit 2030 is illustrated as a square, for convenience in explain.

The speaker unit 2030 may include a plurality of ceramic parts CE having the piezoelectric properties and a plurality of organic film parts PO having the flexibility properties. Each of the plurality of ceramic parts CE and each of the plurality of organic film part PO may be alternately arranged. The ceramic parts CE may include an electrode active material.

The speaker unit 2030 may be a vibration element for generating the sounds by vibrating the substrate SUB. The speaker unit 2030 may be a vibration element capable of generating sound waves within human audible frequency range of 20 Hz to 20,000 Hz. For example, it may have the structure as shown in FIG. 5 or FIG. 6. More preferably, as shown in FIG. 7, the speaker unit 2030 may have the structure in which the widths of the ceramic parts CE may be virable so as to be suitable for generating sound waves in a wide frequency bands with a considerable output amount.

In detail, the speaker unit 2030 may include a ceramic unit CE having the widest width (aling the X-axis direction) is disposed on the outmost side, and the ceramic units CE having narrower widths are disposed toward the center area. The organic layer parts PO may have the same width and may be disposed between the ceramic parts CE having different widths.

Figure 8:
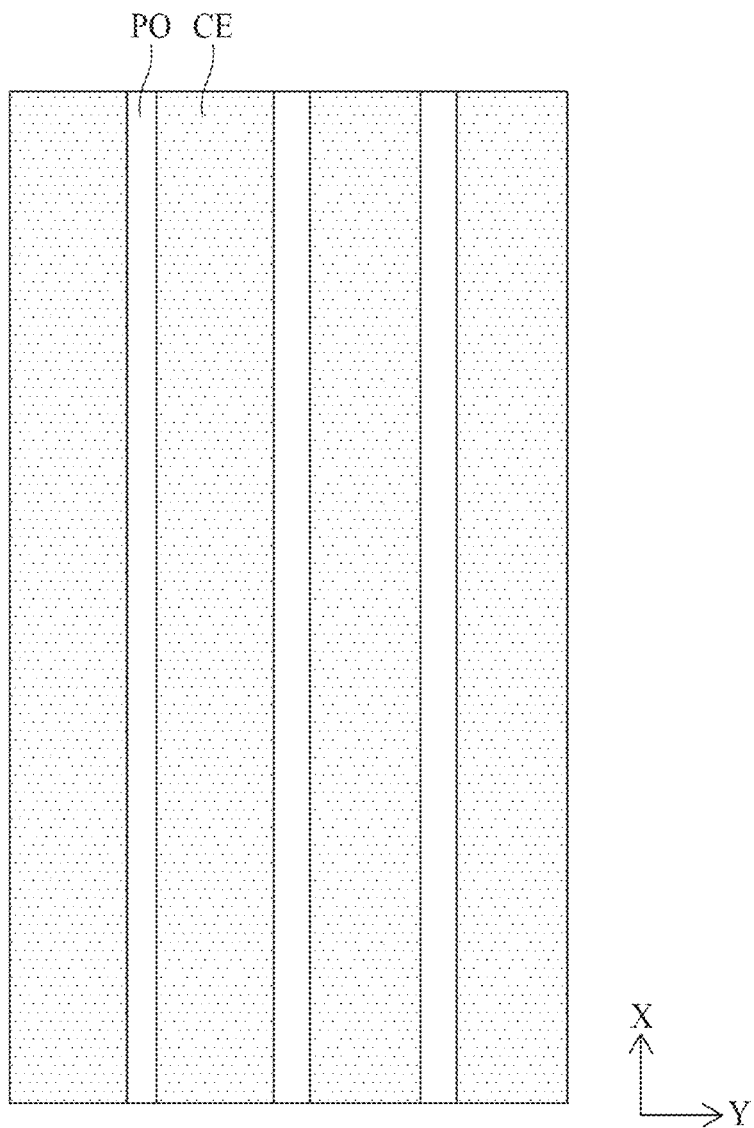
FIG. 8 is a plan view illustrating a structure of a fourth vibration unit according to the first embodiment of the present disclosure.

FIG. 8 is a plan view illustrating a structure of a fourth vibration unit according to the first embodiment of the present disclosure. Here, the fourth vibration unit may be the haptic unit 2040. For example, the haptic unit 2040 may have various shapes such as a square, a circle, and an oval shapes. In FIG. 8, the haptic unit 2040 is illustrated as a square, for convenience in explain.

The haptic unit 2040 may include a plurality of ceramic parts CE having the piezoelectric properties and a plurality of organic film parts PO having the flexibility properties. Each of the plurality of ceramic parts CE and each of the plurality of organic film part PO may be alternately arranged. The ceramic parts CE may include an electrode active material.

The haptic unit 2040 may be a vibration element for providing the vibration to a user's tactile sense via the substrate SUB. The haptic unit 2040 may be a vibration element capable of generating vibrations within range of 60 Hz to 280 Hz suitable for human perception. For example, it may have the structure as shown in FIG. 5 or FIG. 6. More preferably, as shown in FIG. 8, the haptic unit 2040 may have the structure in which the ceramic parts CE may have relatively wider width (along Y-axis direction) and a length along the X-axis direction. The organic parts PO may have relatively narrower width and a length same with the ceramic parts CE.

The haptic unit 2040 may generate a vibration of 300 Hz or less which may overlap with the frequency of the ultra-low range of the sound wave generated by the sound unit 2030. Accordinlgy, the haptic unit 2040 may be also used as a woofer speaker for providing the ultra-low pitched sounds as operating with the speaker unit 2030, not only for haptic operation.

The vibration units 2010, 2020, 2030 and 2040 shown in FIGS. 5 to 8 may have the similar structure. There may be differneces suitable for applicable function or features. For the case of large amplitude and low frequency, it is preferable that the ceramic parts CE, main element for generating vibrations, may have relatively long length. For the case that the shape of vibration unit has a shape of which long length is on X-azis and short length is on Y-axis, the long side of the ceramic parts CE may be disposed on the X-axis. For another example of small amplitude and high frequency, it is preferable that ceramic parts CE may be configured to have relativel short length. For the case that the shape of vibration unit has a shape of which long length is on X-axie and short length is on Y-axis, the long side of the ceramic parts CE may be disposed on the Y-axis. According to the intensity of the vibration, the ceramic CE may be set as to be longer or shorter. When the width is wider the vibration may be strong but may be soft. When the width is narrower, the vibration may be weak but may be sharp. Hereinafter, the commonly applied features may be explained below.

The vibration units 2010, 2020, 2030 and 2040 may have a structure in which a plurality of ceramic parts CE and a plurality of organic film parts PO are alternately arranged. The ceramic parts CE may be made of an electro active material. The electro active material have the characteristics in which when a pressure force or a twisting force is applied on the crystal structure due to an external force, a portential difference occurs due to dielectric polarization according to a change in the relative position of positive (+) ions and negative (−) ions. On the other hands, when an electric voltage is applied to the electro active material, the electro active material may generate a vibration corresponding to the electric field formed by the electric voltage.

Each of the plurality of organic film parts PO may be disposed as being alternately with each of the plurality of ceramic parts CE. The plurality of ceramic parts CE and the plurality of organic film parts PO may be disposed (or arranged) parallel to each other on the same plane (or the same layer). Each of the organic film parts PO may be configured to fill a gap between two adjacent ceramic parts CE, thereby being connected to or adhered to the adjacent ceramic part CE. Accordingly, the vibration energy of the vibration units 2010, 2020, 2030 and 2040 due to the linkage in the unit grid of the ceramic part CE may be increased by the organic film part PO. As the vibration units 2010, 2020, 2030 and 2040 may be configured to be one composite film (or organic-inorganic composite film) having a singl-layer structure by alternately arranging the ceramic parts CE and the organic film parts PO along the width direction (Y-axis) on the same plane.

The plurality of organic film parts PO may be made of the organic material, and arranged between two ceramic parts CE including the inorganic material. The organic material is disposed between the inorganic materials to absorb the impact applied to the inorganic material (or ceramic part CE) and to release the stress concentrated on the inorganic material. Accordingly, the receiver unit 2010 may have the enhanced durability.

The plurality of organic film parts PO may provide the flexibility to the vibration units 2010, 2020, 2030 and 2040. As ensuring the flexibility, the vibration units 2010, 2020, 2030 and 2040 may be bent as to have a shape matched to the shape of the substrate SUB of the display DIS. For example, when the display DIS is a flexible or rollable display, the vibration units 2010, 2020, 2030 and 2040 may be bent or rolled as the substrate SUB is bent or rolled. The vibration units 2010, 2020, 2030 and 2040 may provide the vibration to the substrate SUB according to the electric signal. For an example, the vibration units 2010, 2020, 2030 and 2040 may be vibrated in accordance with the voice signal synchronized with the video represented on the display DIS to vibrate the substrate SUB. For another example, the vibration units 2010, 2020, 2030 and 2040 may be vibrated in accordance with the haptic feed back signal (or tactile feed back signal) synchronized with the touch operation of the user on the touch panel (or touch sensor layer) embedded into or disposed onto the emission layer EL. Accordingly, the substrate SUB of the display DIS may provide at least one of sounds and haptic vibration to the user in accordance with the vibration of the vibration units 2010, 2020, 2030 and 2040.

In addition, as the flexible vibration film according to the present disclosure may include the inorganic material (ceramic parts) and the organic material (organic film parts) on the same layer, the external impact to the inorganic material may be absorbed by the organic material. Further, the damages on the inorganic material and the degradation of vibration property (or degradation of sound property) due to the damage from the external impact applied to the display may be minimized or prevented.

The flexible vibration film according to the present disclosure may have a structure in which a plurality of vibration units is arrayed within the insulating parts on the same levled plane. Therefore, differences due to the vibration characteristics between each vibration unit may not inferfere with each other, so that the vibration characteristics may be ensured independently. Further, the flexibility may be ensured in maximum condition, so that an ultra-thin vibration element may be provided for the flexible display. For the case of flexible display, it may be very hard to implement to include the speaker system in accordance with the conventional arts. However, according to the present disclosure, a flexible display having the receiver, the speaker, the haptic element and the microphone may be integrated with the flexible display.

Second Embodiment

Figure 9:
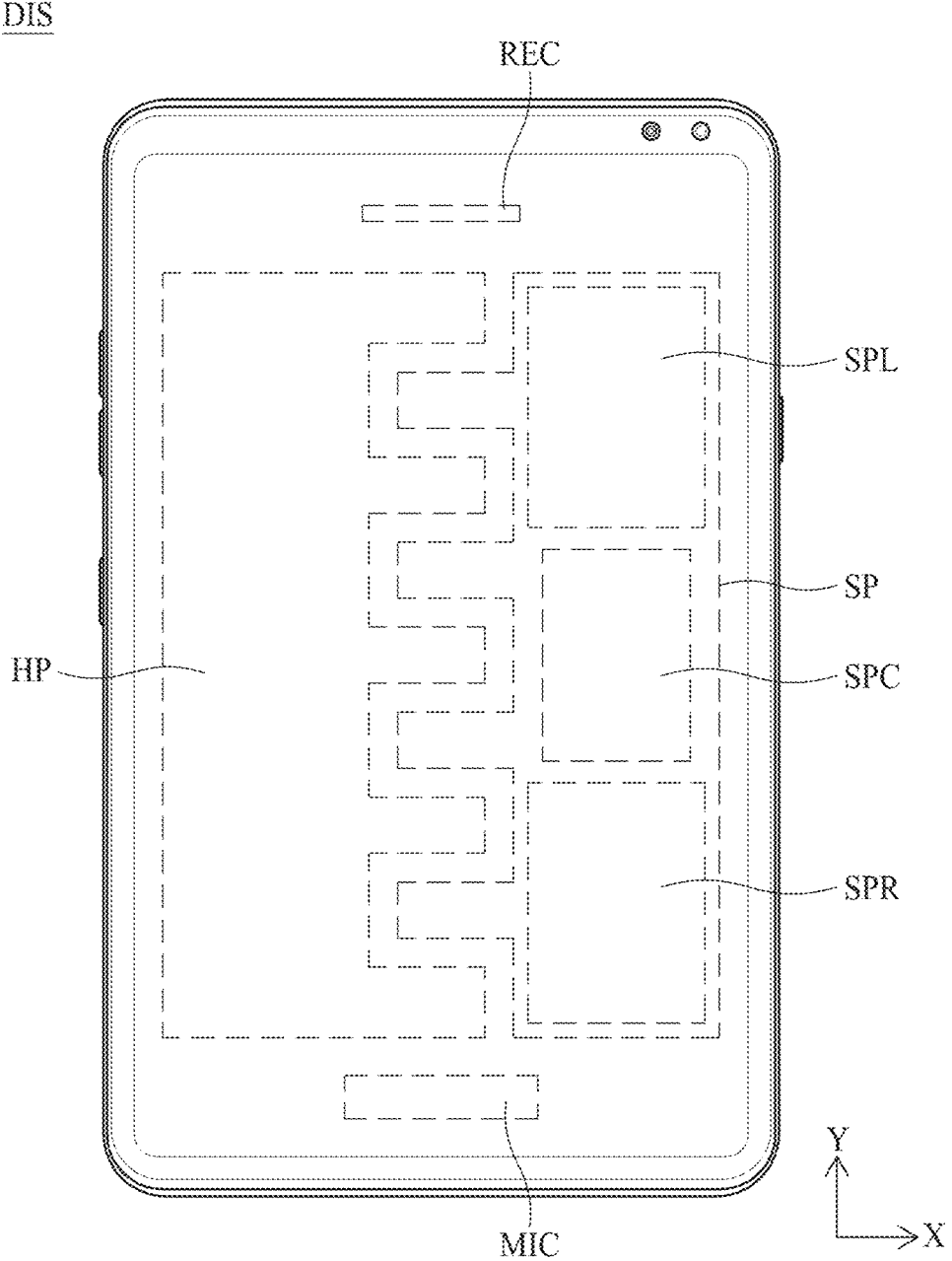
FIG. 9 is a plan view illustrating a display including an integrated type flexible vibration film according to the second embodiment of the present disclosure.

Hereinafter, referring to FIG. 9, the second embodiment of the present disclosure will be explained. FIG. 9 is a plan view illustrating a display including an integrated type flexible vibration film according to the second embodiment of the present disclosure. FIG. 9 shows the case in which the integrated type flexible vibration film according to the second embodiment is applied to the personal information processing device such as the tablet personal computer.

The display including an integrated type flexible vibration film according to the second embodiment of the present disclosure may have very similar structure with the first embodiment. The difference is on the shape and arrangement of the vibration units configuring the integrated type flexible vibration film.

The second embodiment may provide a structure suitable for the display element of the tablet personal computer which may be used in the portrait status or in the landscape status in accordance with the used purpose such as writing a document using the on-screen keyboard.

For example, the tablet personal computer may have a phone function like the mobile phones. Therefore, the receiver unit REC may be disposed at the upper middle portion of the display DIS and the microphone unit MIC may be disposed at the lower middle portion of the display DIS in the portrait status. In addition, under the portrait status, the speaker unit SP may be disposed at the left column and the haptic unit HP may be disposed at the right column. Here, the haptic unit HP may be pereferably disposed at the position where the on-screen keyboard may be appeared when the display DIS is turn to landscape status.

FIG. 9 illustrates the case in which the haptic unit HP is disposed at lower portion when rotating the display DIS to 90 degree to left direction (or countclock direction). The speaker unit SP may be disposed at the upper portion. In addition, when the display DIS is under the landscape status, the speaker unit SP may include a left speaker unit SPL and a right speaker unit SPR which are separately disposed. Further, a center speaker unit SPC may be included between the left speaker unit SPL and the right speaker unit SPR.

Third Embodiment

Figure 10:
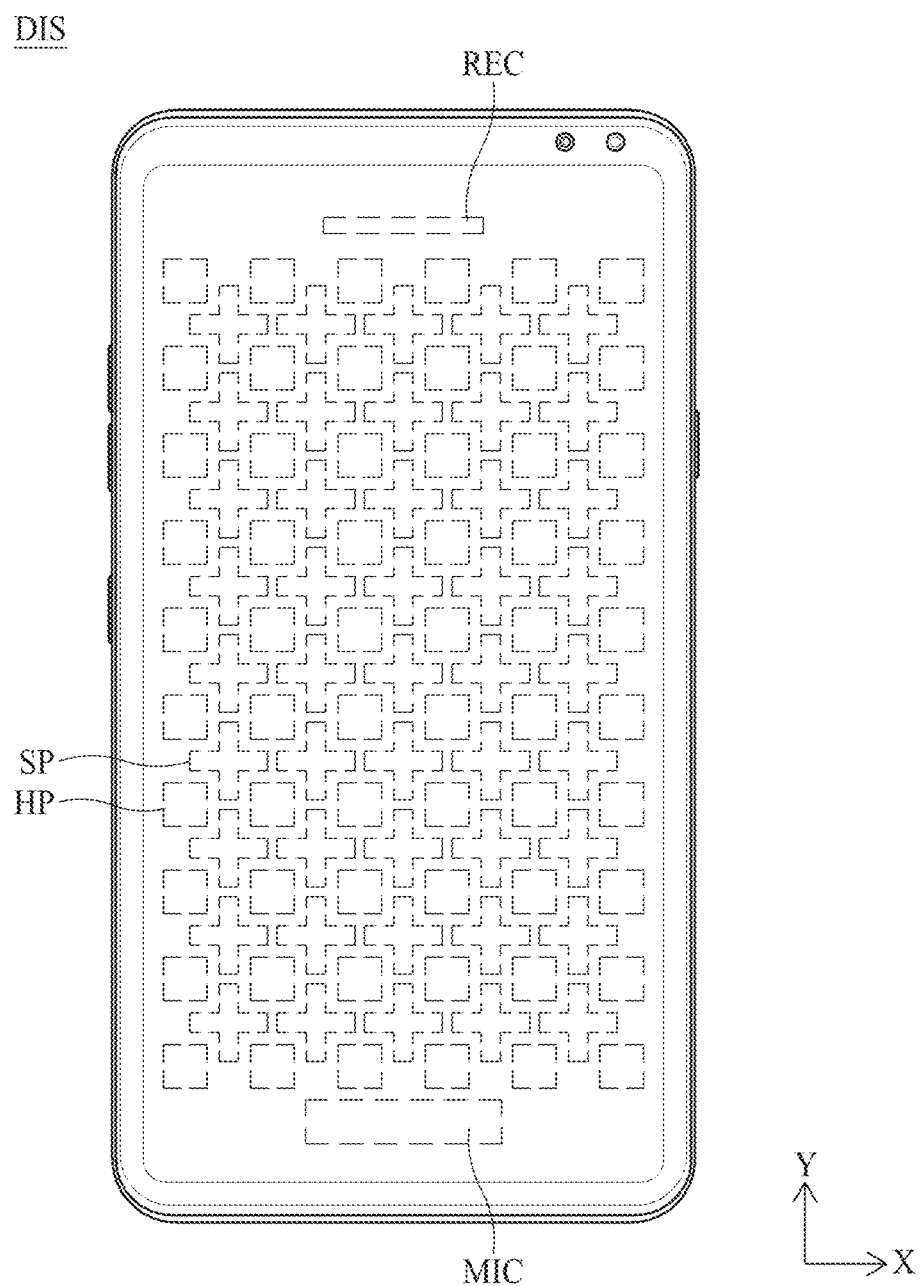
FIG. 10 is a plan view illustrating a display including an integrated type flexible vibration film according to the third embodiment of the present disclosure.

Hereinafter, referring to FIG. 10, the third embodiment of the present disclosure will be explained. FIG. 10 is a plan view illustrating a display including an integrated type flexible vibration film according to the third embodiment of the present disclosure.

In the third embodiment, the speaker units SP and the haptic units HP may have a small size and alternately arrayed in a matrix manner within the display area DA. Each of the haptic units HP may have a square shape corresponding of the contact area with the humans finger tip, so as to configure to provide the feed back vibration signal in accordance with the touch operation of the user.

In one example, the haptic units HP may be arrayed in a matrix manner in which each of squares are disposed with a predetermined distance from each other. In this case, the speaker units SP may have '+' shape, and every one speaker unit SP may be disposed between each of haptic units HP.

Under this structure, when inputting character or number using the on-screen keyboard or key-pad, a vibration signal to feed back whether the key is input or not may be provided through the haptic unit HP disposed corresponding position of the key whenever the key is pressed or touched.

In another embodiment, by providing a higher frequency vibration to the haptic unit HP arranged at the 'F' key and the 'J' key position to acknowledge the reference position of the key arrangement on the screen keyboard, it is possible to recognize whether the finger is in the correct position or not by tactile sense as placing the fingers on the screen keyboard.

The speaker unit SP may provide various sound effects including stereo sound effects by dividing each screen area into a left speaker unit, a right speaker unit and a center speaker unit. Further, the haptic unit HP may also be used as a woofer speaker unit by outputting a signal in an ultra-low pitched sound of 200 Ha or lower. When the haptic unit HP is operated together with the woofer speaker function, the haptic unit HP may include the electrode formed of the high specific gravity materials such as lead (Pb) and zirconimum-titanium oxide ($ZrTiO_3$) including higher contents than the speaker unit SP or receiver unit REC.

As the vibration units may be disposed in various manners like described in the embodiments of the present disclosure, it may be possible to implement an integrated flexible vibration film that has receiver, speaker, microphone and/or haptic functions in a single film according to the application field and specifications of the product. According to the present disclosure, most of all functions based on vibration characteristics may be provided with one integrated flexible vibration film without additional equipment such as receivers, speakers and microphones consisting of coil and magnet and eccentric motors which take up significant volume. The integrated flexible vibration film according to the present disclosure may be implemented in ultra-thin type and have excellent flexibility, so it may be applied to a flexible display. In addition, it may be implemented an ultra-thin and ultra-light weight display.

Features, structures, effects and so on described in the above described examples of the present disclosure are included in at least one example of the present disclosure, and are not necessarily limited to only one example. Furthermore, features, structures, effects and so on exemplified in at least one example of the present disclosure may be implemented by combining or modifying other examples by a person having ordinary skilled in this field. Therefore, contents related to such combinations and modifications should be interpreted as being included in the scope of the present application.

It will be apparent to those skilled in the art that various modifications and variations can be made in the flexible vibration film and the display of the present disclosure without departing from the spirit or scope of the disclosures. Thus, it is intended that the present disclosure covers the modifications and variations of this disclosure provided they come within the scope of the appended claims and their equivalents. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A flexible vibration film, comprising:
a vibration layer, the vibration layer including:
a first vibration unit having a first vibration characteristics;
a second vibration unit having a second vibration characteristics; and
a flexible insulating part disposed between the first vibration unit and the second vibration unit;
a first electrode layer disposed on a bottom surface of the vibration layer, the first electrode layer including:
a first part corresponding to the first vibration unit; and
a second part corresponding to the second vibration unit;
a second electrode layer disposed on a top surface of the vibration layer,
a first signal line connected to the first part, disposed on the flexible insulating part and extended to an end side of the vibration layer; and
a second signal line connected to the second electrode part, disposed on the flexible insulating part and extended to the end side of the vibration layer.

2. The flexible vibration film according to claim 1, further comprising:
a first protective layer covering the first electrode layer; and
a second protective layer covering the second electrode layer.

3. The flexible vibration film according to claim 1, wherein the first vibration unit includes:
a plurality of first piezoelectric parts having a first width; and
a plurality of first insulating parts between each of the plurality of the first piezoelectric parts, and
wherein the second vibration unit includes:
a plurality of second piezoelectric parts having a second width; and
a plurality of second insulating parts between each of the plurality of the second piezoelectric parts.

4. The flexible vibration film according to claim 3, wherein the first piezoelectric parts and the second piezoelectric parts include an inorganic material, and
wherein the first insulating part and the second insulating part include an organic material.

5. The flexible vibration film according to claim 3, wherein the plurality of the first piezoelectric parts, the plurality of the insulating parts, the plurality of the second piezoelectric parts and the plurality of the second insulating parts are arranged side by side on a same plane, and
wherein the first piezoelectric parts have different size from the second piezoelectric parts.

6. The flexible vibration film according to claim 1, wherein the vibration layer further includes a third vibration unit having a third vibration characteristics, and
wherein the flexible insulating part is disposed among the first vibration unit, the second vibration unit and the third vibration unit.

7. The flexible vibration film according to claim 1, wherein the first vibration unit and the second vibration unit divided in a plurality of sectors, and
wherein the sectors of the first vibration unit and the sectors of the second vibration unit are alternately arrayed.

8. The flexible vibration film according to claim 1, wherein the first vibration unit provides a sound wave of 300 Hz to 20,000 Hz, and
wherein the second vibration unit provides a vibration wave of 60 Hz to 280 Hz.

9. The flexible vibration film according to claim 1, wherein the first vibration unit provides a sound wave of 300 Hz to 20,000 Hz, and
wherein the second vibration unit provides any one of the sound wave of 300 Hz to 20,000 Hz and a vibration wave of 60 Hz to 280 Hz.

10. A flexible vibration film, comprising:
a vibration layer including a first vibration unit, a second vibration unit and a flexible insulating part between the first vibration unit and the second vibration unit;
an upper electrode layer including a first electrode on the first vibration unit and a second electrode on the second vibration unit;
a lower electrode layer disposed on a bottom surface of the vibration layer;
an upper protective layer covering the upper electrode layer;
a lower protective layer covering the lower electrode layer;
a first signal line connected to the first electrode, disposed on the flexible insulating layer and extended to an end side of the vibration layer; and
a second signal line connected to the second electrode, disposed on the flexible insulating layer and extended to the end side of the vibration layer.

11. The flexible vibration film according to claim 10, wherein the first vibration unit includes:
a plurality of first piezoelectric parts having a first width; and
a plurality of first insulating parts among the plurality of the first piezoelectric parts, and
wherein the second vibration unit includes:
a plurality of second piezoelectric parts having a second width; and
a plurality of second insulating parts among the plurality of the second piezoelectric parts.

12. The flexible vibration film according to claim 11, wherein the plurality of the first piezoelectric parts, the plurality of the first insulating parts, the plurality of the second piezoelectric parts and the plurality of the second insulating parts are arranged side by side on a same plane, and
wherein the first piezoelectric parts have different size from the second piezoelectric parts.

13. The flexible vibration film according to claim 10, wherein the first vibration unit and the second vibration unit are divided into a plurality of sectors, and wherein the plurality of sectors of the first vibration unit and the second vibration unit are alternately arranged.

14. The flexible vibration film according to claim 10, wherein the first vibration unit provides a sound wave of 300 Hz to 20,000 Hz, and wherein the second vibration unit provides any one of the sound wave of 300 Hz to 20,000 Hz and a vibration wave of 60 Hz to 280 Hz.

15. A display, comprising: the flexible vibration film according to the claim 1; a substrate on a surface of the flexible vibration film; an emission layer on the substrate; an encapsulation layer on the emission layer; a cover plate on the encapsulation layer; and a middle frame on an opposite surface of the flexible vibration film.

* * * * *